(12) United States Patent
McLaughlin et al.

(10) Patent No.: US 11,828,834 B2
(45) Date of Patent: Nov. 28, 2023

(54) ULTRA-WIDEBAND COMMUNICATION SYSTEM

(71) Applicant: Decawave Ltd., Dublin (IE)

(72) Inventors: Michael McLaughlin, Dublin (IE); Ciaran McElroy, Dublin (IE); Igor Dotlic, Dublin (IE); Billy Verso, Maynooth (IE); Jaroslaw Niewczas, Jozefow (PL)

(73) Assignee: DecaWave, LTD., Dublin (IE)

( * ) Notice: Subject to any disclaimer, the term of this patent is extended or adjusted under 35 U.S.C. 154(b) by 0 days.

(21) Appl. No.: 16/672,129

(22) PCT Filed: Mar. 6, 2019

(86) PCT No.: PCT/EP2019/055623
§ 371 (c)(1),
(2) Date: Nov. 1, 2019

(87) PCT Pub. No.: WO2019/170782
PCT Pub. Date: Sep. 12, 2019

(65) Prior Publication Data
US 2020/0284893 A1  Sep. 10, 2020

Related U.S. Application Data

(60) Provisional application No. 62/639,022, filed on Mar. 6, 2018, provisional application No. 62/667,909, filed
(Continued)

(51) Int. Cl.
*G01S 13/22* (2006.01)
*H01Q 5/25* (2015.01)
(Continued)

(52) U.S. Cl.
CPC .......... *G01S 13/225* (2013.01); *G01R 23/155* (2013.01); *G01S 13/0209* (2013.01);
(Continued)

(58) Field of Classification Search
CPC ..... G01S 13/225; G01S 13/0209; H01Q 5/25; G01R 23/155; H04B 1/71635;
(Continued)

(56) References Cited

U.S. PATENT DOCUMENTS 7,636,397 B2  12/2009  McLaughlin
7,787,544 B2   8/2010  McLaughlin
(Continued)

FOREIGN PATENT DOCUMENTS

EP   3050516 A1 *  8/2016  ............... A61B 8/06
EP   3370464 A1    9/2018
(Continued)

OTHER PUBLICATIONS

Bill Verso, et al: "UWB PHY text for integration into 802.15.8 draft", IEE-SA Mentor, Piscataway, NJ USA, vol. 802 15.8, Nov. 4, 2014; URL:https://mentor.iee.org/802.15/dcn/14/15-14-0654-00-0008-uwb-phy-text-for-integration-into-802-15-8-draft.docx.
(Continued)

*Primary Examiner* — Duc C Ho
(74) *Attorney, Agent, or Firm* — Withrow & Terranova, P.L.L.C.

(57) ABSTRACT

In an ultra-wideband ("UWB") communication system, methods are disclosed for transmitting packets in multiple portions, each having a different pulse repetition frequency ("PRF"). Methods are also disclosed for transmitting packets dis-continuously.

10 Claims, 5 Drawing Sheets

Related U.S. Application Data on May 7, 2018, provisional application No. 62/695,140, filed on Jul. 8, 2018.

(51) Int. Cl.
| | |
|---|---|
| *G01R 23/15* | (2006.01) |
| *G01S 13/02* | (2006.01) |
| *H04L 9/06* | (2006.01) |
| *H04L 27/26* | (2006.01) |
| *H04L 9/40* | (2022.01) |
| *H04L 69/22* | (2022.01) |
| *H04B 1/7163* | (2011.01) |
| *H04B 1/7176* | (2011.01) |

(52) U.S. Cl.
CPC ............. *H01Q 5/25* (2015.01); *H04B 1/7176* (2013.01); *H04B 1/71635* (2013.01); *H04B 1/71637* (2013.01); *H04L 9/0618* (2013.01); *H04L 27/2605* (2013.01); *H04L 63/0428* (2013.01); *H04L 69/22* (2013.01)

(58) Field of Classification Search
CPC . H04B 1/71637; H04B 1/7176; H04L 9/0618; H04L 27/2605; H04L 63/0428; H04L 69/22

See application file for complete search history.

(56) References Cited

U.S. PATENT DOCUMENTS

| | | | |
|---|---|---|---|
| 8,358,709 | B2 | 1/2013 | McLaughlin |
| 8,436,758 | B2 | 5/2013 | McLaughlin et al. |
| 8,437,432 | B2 | 5/2013 | McLaughlin et al. |
| 8,677,224 | B2 | 3/2014 | McLaughlin et al. |
| 8,760,334 | B2 | 6/2014 | McLaughlin et al. |
| 9,054,790 | B2 | 6/2015 | McLaughlin et al. |
| 9,325,338 | B2 | 4/2016 | McLaughlin et al. |
| 11,275,166 | B2 | 3/2022 | McLaughlin et al. |
| 2003/0072273 | A1 | 4/2003 | Aiello et al. |
| 2004/0077306 | A1* | 4/2004 | Shor ............... H04B 1/7174 398/1 |
| 2006/0203795 | A1 | 9/2006 | Welborn et al. |
| 2007/0297523 | A1 | 12/2007 | Cattaneo et al. |
| 2008/0018521 | A1 | 1/2008 | Sahinoglu et al. |
| 2010/0027457 | A1 | 2/2010 | Okuda |
| 2010/0027587 | A1 | 2/2010 | Lakkis |
| 2010/0226414 | A1 | 9/2010 | Neirynck et al. |
| 2010/0246639 | A1 | 9/2010 | Roh et al. |
| 2010/0265991 | A1 | 10/2010 | Oh et al. |
| 2011/0038309 | A1 | 2/2011 | Shi et al. |
| 2013/0141270 | A1* | 6/2013 | Rodenbeck ......... G01S 13/0209 342/21 |
| 2015/0193409 | A1 | 7/2015 | Portnoy et al. |
| 2017/0359134 | A1 | 12/2017 | Baier et al. |
| 2021/0044323 | A1 | 2/2021 | McLaughlin et al. |

FOREIGN PATENT DOCUMENTS

| | | | | |
|---|---|---|---|---|
| WO | WO-03071766 A1 * | 8/2003 | ......... | H04B 1/17176 |
| WO | 2015193409 A1 | 12/2015 | | |

OTHER PUBLICATIONS

Extended European Search Report for European Patent Application No. 20153216.5, dated May 18, 2020, 10 pages.
Examination Report for European Patent Application No. 20153216.5, dated Jun. 30, 2020, 5 pages.
Examination Report for European Patent Application No. 19709703.3, dated Feb. 13, 2020, 6 pages.
Examination Report for European Patent Application No. 19709703.3, dated Aug. 19, 2020, 5 pages.
International Search Report and Written Opinion for International Patent Application No. PCT/EP2019/055623, dated Jul. 1, 2019, 8 pages.
International Search Report and Written Opinion for International Patent Application No. PCT/EP2019/055624, dated Jul. 2, 2019, 9 pages.
Non-Final Office Action for U.S. Appl. No. 16/978,154, dated May 13, 2021, 8 pages.
Second Office Action for Chinese Patent Application No. 201980030636.1, dated Apr. 25, 2022, 10 pages.
Notice of Allowance for U.S. Appl. No. 16/978,154, dated Nov. 5, 2021, 8 pages.
First Office Action for Chinese Patent Application No. 201980030636.1, dated Sep. 18, 2021, 13 pages.
Examination Report for European Patent Application No. 19709703.3, dated Dec. 22, 2021, 6 pages.
Examination Report for European Patent Application No. 20153216.5, dated May 21, 2021, 6 pages.
Third Office Action for Chinese Patent Application No. 201980030636.1, dated Sep. 22, 2022, 16 pages.
Request for the Submission of an Opinion for Korean Patent Application No. 1020207028660, dated Dec. 13, 2022, 9 pages.
Decision of Refusal for Japanese Patent Application No. 2020546361, dated Jun. 6, 2023, 6 pages.
Notice of Allowance for Korean Patent Application No. 1020207028660, dated Jun. 24, 2023, 4 pages.

\* cited by examiner

ULTRA-WIDEBAND COMMUNICATION SYSTEM

CROSS-REFERENCE TO RELATED APPLICATIONS

This application is a national stage entry of and related to PCT Application Serial No. PCT/EP2019/055623 ("PCT Application") and is also related to the following:

1. Provisional Application Ser. No. 62/639,022, filed 6 Mar. 2018 ("First Parent Provisional");
2. Provisional Application Ser. No. 62/667,909, filed 7 May 2018 ("Second Parent Provisional"); and
3. Provisional Application Ser. No. 62/695,140, filed 8 Jul. 2018 ("Third Parent Provisional").

This application claims priority to the PCT Application, and the First, Second and Third Parent Provisionals, and hereby claims benefit of the filing dates thereof pursuant to 37 CFR § 1.78(a)(4).

The subject matter of the PCT Application, and the First, Second and Third Parent Provisionals, each in its entirety, is expressly incorporated herein by reference.

BACKGROUND OF THE INVENTION

1. Field of the Invention

The present invention relates generally to wireless communication systems, and, in particular, to a wireless communication system having improved performance.

2. Description of the Related Art

In general, in the descriptions that follow, we will italicize the first occurrence of each special term of art which should be familiar to those skilled in the art of ultra-wideband ("UWB") communication systems. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, we may refer to the mutually exclusive Boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

By way of example, in an ultra-wideband ("UWB") communication system, a series of special processing steps are performed by a UWB transmitter to prepare payload data for transmission via a packet-based UWB channel. Upon reception, a corresponding series of reversing steps are performed by a UWB receiver to recover the data payload. Details of both series of processing steps are fully described in IEEE Standards 802.15.4 ("802.15.4") and 802.15.4a ("802.15.4a") ("Standards"), copies of which are submitted herewith and which are expressly incorporated herein in their entirety by reference. As is known, these Standards describe required functions of both the transmit ("Tx") and receive ("Rx") portions of the system, but specify implementation details only of the transmit portion of the system, leaving to implementers the choice of how to implement the receive portion.

One or more of us have developed certain improvements for use in UWB communication systems, which improvements are fully described in the following pending applications or issued patents, all of which are expressly incorporated herein in their entirety:

"A Method and Apparatus for Transmitting and Receiving Convolutionally Coded Data", U.S. Pat. No. 7,636,397, issued 22 Dec. 2009;

"A Method and Apparatus for Generating Codewords", U.S. Pat. No. 7,787,544, issued 31 Jul. 2010;

"A Method and Apparatus for Transmitting and Receiving Convolutionally Coded Data", U.S. Pat. No. 8,358,709, issued 22 Jan. 2013; and "Receiver for Use in an Ultra-Wideband Communication System", U.S. Pat. No. 8,437,432, issued 7 May 2013;

"Convolution Code for Use in a Communication System", U.S. Pat. No. 8,677,224, issued 18 Mar. 2014;

"Adaptive Ternary A/D Converter for Use in an Ultra-Wideband Communication System", U.S. Pat. No. 8,436,758, issued 7 May 2013;

"Receiver for Use in an Ultra-Wideband Communication System", U.S. Pat. No. 8,760,334, issued 24 Jun. 2014;

"Receiver for Use in an Ultra-Wideband Communication System", U.S. Pat. No. 9,054,790, issued 9 Jun. 2015;

"Adaptive Ternary A/D Converter for Use in an Ultra-Wideband Communication System", U.S. Pat. No. 9,325,338, issued 26 Apr. 2016; and "Secure Channel Sounding", PCT Application EP2017/052564, filed 6 Feb. 2017.

In conformance with the Standards, a UWB communication system may be adapted to implement an embodiment of a known 27 Mbps modulation schema. In accordance with this schema, the highest data rate currently defined is 6.8 Mbps at a pulse repetition frequency ("PRF") of 64 MHz. We submit that it is both possible and desirable to allow the PRF to vary within a packet.

Even if a typical UWB communication system is adapted to operate at a High Rate Pulse ("HRP"), packet transmission is continuous: preamble, SFD, data, plus, maybe, cipher—all concatenated together in a continuous transmission. In general, this makes it easier to acquire and maintain carrier synchronization. However, despite causing implementation difficulties in some implementations of the receiver, we submit that having dis-continuous packets will offer advantages.

We submit that what is needed is an improved method and apparatus for use in the receiver of a wireless communication system to transmit packets at variable PRF. Further, we submit that such variable PRF packets be transmitted dis-continuously. In particular, we submit that such a method and apparatus should provide performance generally comparable to the best prior art techniques, but allow packets to be transmitted dis-continuously.

BRIEF SUMMARY OF THE INVENTION

In accordance with a preferred embodiment of our invention, we provide a method for use in a wireless communication system for transmitting a packet comprising first and second portions. In particular, the method comprises configuring a transmitter facility of the system to perform the steps of: transmitting the first portion of the packet at a selected first pulse repetition frequency ("PRF"); and transmitting the second portion of the packet at a selected second PRF different from the first PRF. Further, the method comprises configuring the system to perform the step of transmitting the packet dis-continuously.

In one further embodiment, a wireless communication system is configured to perform our method for transmitting dis-continuous packets.

The methods of our invention may be embodied in computer readable code on a suitable non-transitory computer readable medium such that when a processor executes the computer readable code, the processor executes the respective method.

The methods of our invention may be embodied in non-transitory computer readable code on a suitable computer readable medium such that when a processor executes the computer readable code, the processor executes the respective method.

BRIEF DESCRIPTION OF THE SEVERAL VIEWS OF THE DRAWINGS

Our invention may be more fully understood by a description of certain preferred embodiments in conjunction with the attached drawings in which.

Figure 1:
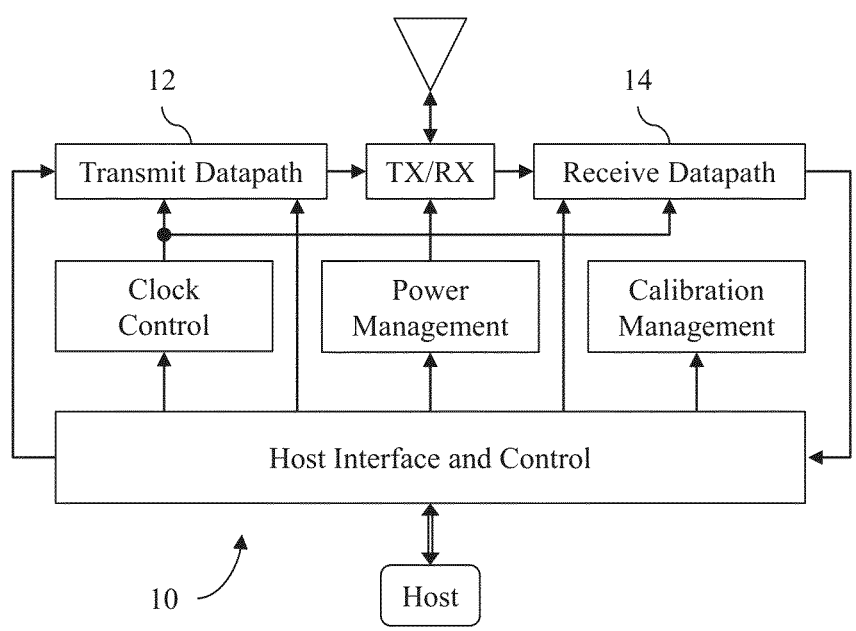
FIG. 1 illustrates, in block diagram form, one embodiment of a receiver adapted for use in a UWB communication system, the receiver comprising both transmission and reception facilities.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Figure 2:
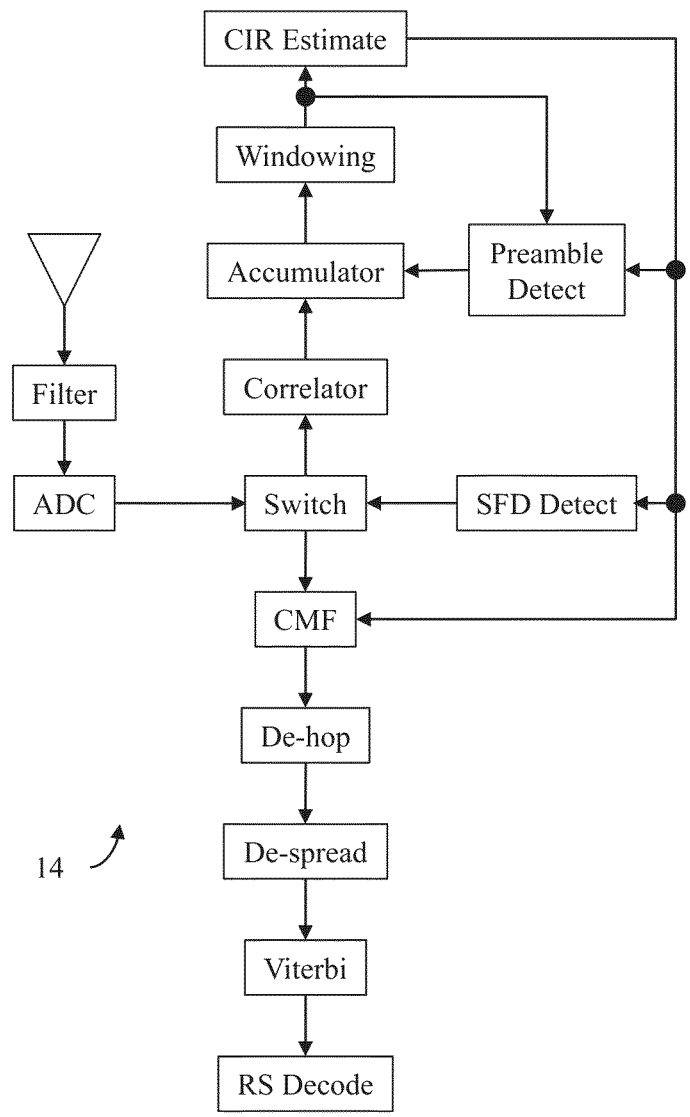
FIG. 2 illustrates, in block diagram form, one embodiment of a receiver facility adapted to practice our invention.

Shown by way of example in FIG. 1 is one embodiment of a receiver 10 adapted for use in a UWB communication system, the receiver 10 comprising both a transmit facility 12 and a receive facility 14. Shown by way of example in FIG. 2 is one embodiment of a receive facility 14 adapted to practice our invention. Complete details relating to the construction and methods of operation of receiver 10, and the transmit and receive facilities 12-14, may be found in one or more of the patents set forth above.

In our Third Parent Provisional, we have disclosed several methods for varying the PRF of different components of a Standard UWB packet. On Slide 11, we introduce the possibility that the Standards support a 27 Mbps data rate at the nominal PRF of 64 MHz wherein, in a first variant, V1, each burst consists of 2 pulses with a 2 ns spacing there between. However, we noted in Slide 12 that this V1 is less than desirable due to a high spectral peak to average ratio ("SPAR"). We therefore proposed in Slide 13 a second variant, V2, in which the pulses per burst is increased from 2 to 8. Based in part on simulations that we have performed, we noted that V2 predicts several important advantages:

6 dB better performance that of V1;

Same range of V1 over the Standard 6.8 Mbps mode (assuming peak antenna voltage limited to ~0.7 v; and Power consumption for Tx and Rx data portion of the frame is ¼ that of the Standard 6.8 Mbps mode.

In our First Parent Provisional, we have disclosed the scope and results of our simulations that form the basis of this invention. Let us now summarize those simulation studies with reference to our First Parent Provisional.

In accordance with our Compressed Modulation Schema ("CMS"), the number of transmitted chips per input bit and, hence, the number of transmitted chips per transmitted symbol are equal to the logic_1s in the currently highest data rate specified in the Standards, i.e., 6.8 Mbps at a 64 MHz PRF. However, in our CMS, the data rate is four (4) times the highest Standard data rate. Further, in accordance with our CMS, both of existing concatenated error correction codes, i.e., Reed-Solomon ("RS") and convolutional, are preserved and unmodified. In other words, both error correction coding and decoding schemes are unmodified. What is modified is the way the convolutional-encoded bits are spread in the Tx onto transmitted bursts and, hence, de-spread in the Rx.

Figure 14:
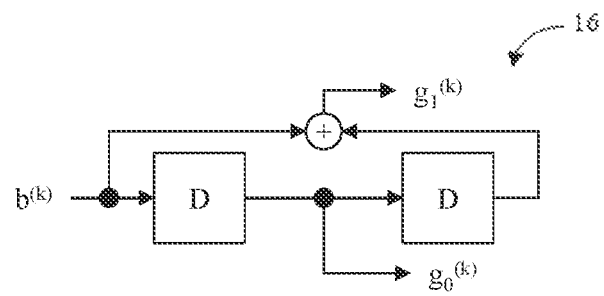
FIG. 14 illustrates, in block diagram form, one embodiment of a convolutional encoder adapted to practice our invention.

In FIG. 14, we have illustrated a convolutional encoder 16 constructed in accordance with the Standards. For the k-th input bit ($b^{(k)}$), encoder 16 outputs two bits: a systematic bit ($g_0^{(k)}$); and a parity bit ($g_1^{(k)}$). In the IEEE 802.15.4a BPPM-BPSK hybrid modulation scheme the burst position is decided by $g_0k$ and it is multiplied by a bipolar version of $g_1^{(k)}$. Hop position and scrambling sequence are generated by a Standard scrambling m-sequence shift register generator.

In accordance with our CMS, $g_1^{(k)}$ still multiplies the burst. Furthermore, scrambling sequence is generated in the same way. However, there is no hopping and position modulation, but, rather, the 0-th position is always used. Now, $g_0^{(k)}$ decides which of two possible mutually orthogonal carrier sequences will be used:

$$s^{(k)} = \begin{cases} s_0 = [+, +, +, +, +, +, +, +], & g_0^{(k)} = 0, \\ s_1 = [-, -, -, -, +, +, +, +], & g_0^{(k)} = 1. \end{cases} \quad \text{Eq. 1}$$

$s^{(k)}$ is then multiplied by the bipolar version of $g_1^{(k)}$ to get $v^{(k)}$:

$$v^{(k)} = (-1)^{g1^{(k)}} s^{(k)} \quad \text{Eq. 2:}$$

$v^{(k)}$ is then scrambled by the scrambling sequence and transmitted.

This can be understood more clearly by the following parallel. In the BPPM-BPSK hybrid, bit $g_0^{(k)}$ places the unscrambled 'all ones' burst in two possible positions, each mutually orthogonal in time. In our CMS, $g_0^{(k)}$ alters the burst itself to use one of two possible unscrambled sequences, each mutually orthogonal in the code space. Notice that the sequence orthogonality is preserved after scrambling. Furthermore, any two binary (±1) orthogonal sequences can be used instead of the above two sequences in Eq. 1, and they would provide the same Euclidian distances between respective constellation points; we have selected these examples for simplicity. Note that the length of the sequences used can also change, e.g., for changing data rate, so long as the orthogonality is preserved.

Figure 15:
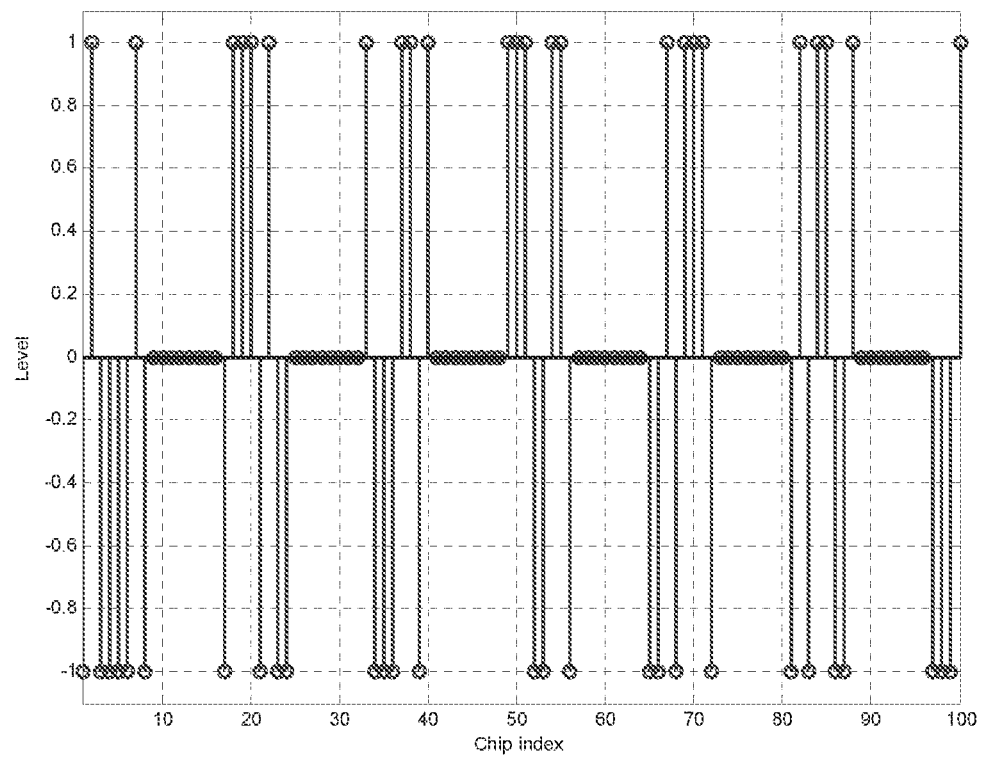
FIG. 15 illustrates, in graphical diagram form, one example of a chip sequence developed in accordance with our invention.

Our CMS develops symbol intervals of 32 ns duration, each comprising 16 chips. The first half of the symbol interval, i.e., comprising 8 chips, is occupied by the scrambled version of $v^{(k)}$, whereas the second half of the symbol interval, also comprising 8 chips, represents a guard interval. FIG. 15 depicts one example of the chip sequence generated in our Matlab testbench. In this embodiment, both the physical header ("PHR") and the physical layer ("PHY") service data unit ("PSDU") use the same compressed modulation format.

After channel match filter ("CMF"), rotation, resampling and descrambling at the chip rate, the receiver 14 will have an estimate of $v^{(k)}$, denoted $\hat{v}^{(k)}$. In order to calculate metrics for the Viterbi decoding, denoted $\hat{p}_0^{(k)}$ and $\hat{p}_1^{(k)}$, the receiver 14 should project $\hat{v}^{(k)}$ onto sequences $s_0$ and $s_1$, respectively:

$$\hat{p}_0^{(k)} = \hat{v}^{(k)} s_0^T, \quad \text{Eq. 3a:}$$

$$\hat{p}_1^{(k)} = \hat{v}^{(k)} s_1^T \quad \text{Eq. 3b:}$$

You should note that the Viterbi metrics $\hat{p}_0^{(k)}$ and $\hat{p}_1^{(k)}$ are analogous to the metrics at positions zero (0) and one (1), respectively, of the BPPM-BPSK hybrid modulation. Hence, they are used in place of these metrics as the input of the Viterbi decoder, carrier loop phasor, etc. In our Matlab code, this is done as follows:
burst=this.resampleOutput(burstOffset+(1: this.nSamplesPerBurst));
dscrmbld=burst(1:this.burstDeciRate:end).*(1−2*this.spreadingSeq);
sL=sum(dscrmbld(1: this.chipsPerBurst/2));
sU=sum(dscrmbld(this.chipsPerBurst/2+1: this.chipsPerBurst));
this.despreadOntime0=sL+sU;
this.despreadOntime1=−sL+sU;
The above Matlab code snippet displays one more important feature: both $\hat{p}_0^{(k)}$ and $\hat{p}_1^{(k)}$ can be calculated from the same two sums of the descrambled chips, wherein the first is the sum of the lower four chips and the second is the sum of the upper four chips. This suggests that there is no need to implement two descramblers in the hardware, since a small modification of the existing one probably would suffice.

For the compressed data mode, a carrier loop sampling period of 1024 ns, already used for all implemented data rates, has been preserved. Since the symbol period is now equal to 32 ns, this mode uses 1024/32=32 smooth steps of the carrier loop for the rotation of the symbols' samples.

By way of completeness, we have provided in the Second Parent Provisional the simulation parameters and performance results of the study we performed on our CMS as disclosed herein. As can be seen, the sensitivity of our 27 Mbps compressed data mode is considerably affected by the 27 Mbps PHR errors. It is known, however, that the PHR is weakly error-protected by the SECDED code. This weak PHR protection does not affect so much the 6.8 Mbps mode sensitivity, since PHR is transmitted at the 8 times lower data rate of 850 kbps, hence, each symbol has 8 times (9 dB) higher energy than 6.8 Mbps PSDU symbols. On the other hand, the compressed mode PHR symbols have the same energy as its PSDU symbols. Comparing the compressed data rate performance with SECDED encoded PHR versus BCH(15, 7) encoded PHR, the impact of using BCH(15,7) code can be clearly seen-it improves performance by roughly 0.3 dB for CFOs of 0 ppm, and 20 ppm. Other, stronger binary block codes should also be considered, e.g., the BCH(31,11) code.

We also studied using ⅛ convolutional code with Hamming free distance of 21 (see, J. Proakis, Digital Communications, ser. Electrical engineering series. McGraw-Hill, 2001, p. 495). We discovered that this code could be generated via the current encoder shown in FIG. 14. Instead of Eq. 1, this code uses the following spreading sequence depending on the encoded bit $g_0^{(k)}$:

$$s^{(k)} = \begin{cases} s_0 = [-,-,-,-,-,-,-,-], & g_0^{(k)} = 0, \\ s_1 = [+,+,-,-,-,+,+,+], & g_0^{(k)} = 1 \end{cases} \quad \text{Eq. 4}$$

while dependence on the bit $g_1^{(k)}$ is the same as in Eq. 2. Notice that the sequences $s_0$ and $s_1$ are not orthogonal. The squared Euclidian free distance of this code equals 84, versus 80 for any code that uses two orthogonal sequences. Hence, theoretically, the coding gain improvement of using this code on a AWGN channel is:

$$10 \log 10(84/80) = 0.21 \text{ dB} \quad \text{Eq. 5:}$$

Since the code can be produced via the existing convolutional encoder, it can be also optimally decoded by the existing Viterbi decoder. The only thing that is changed is the way the Viterbi metrics are calculated. As in Eq. 3, descrambled chips are correlated with the two sequences: $s_0$ and $s_1$ to produce equivalent Viterbi metrics. The below Matlab code snippet shows this:

```
if this.proakisCode
    this.despreadOntime0 = dscrmbld * [−1 −1 −1 −1 −1 −1 −1 −1]';
    this.despreadOntime1 = dscrmbld * [ 1  1 −1 −1 −1  1  1  1]';
else
```

In our current Matlab testbench, there is a single shared xml control, which switches between using the orthogonal code described above and this code for the compressed data mode; it is shown below with its default value:

| <proakisCode> | false | </proakisCode> |

Figures 10, 11, 12, 13:
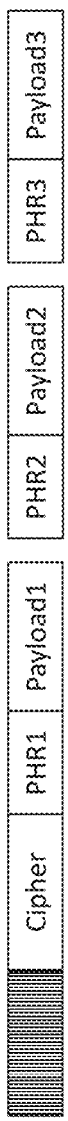
FIG. 10 illustrates, in linear time form, a sixth possible dis-continuous packet transmission sequence.
FIG. 11 illustrates, in linear time form, a seventh possible dis-continuous packet transmission sequence.
FIG. 12 illustrates, in linear time form, an eighth possible dis-continuous packet transmission sequence.
FIG. 13 illustrates, in linear time form, a ninth possible dis-continuous packet transmission sequence.

As shown in FIG. 10 of our Second Parent Provisional, the $10^{-2}$ PER performance of this code on AWGN channel is roughly 0.25 dB better than the performance of the orthogonal code. This agrees with our theoretical prediction. However, as shown in FIG. 11 of our Second Parent Provisional, the $10^{-2}$ PER performance on IEEE CM1 channel is about 0.5 dB worse than the performance of the orthogonal code.

The results set forth in Sec. 4.2 of our Second Parent Provisional was based on the IEEE CM1 model then implemented in our trunk testbench. This model, however, was not completely implemented as the channel model document prescribes. Namely, phases of the paths were set to all zero (0), instead of random. Furthermore, frequency selectivity of the channel, represented by the K parameter in the channel model document, was not implemented. For this reason, we implemented a new channel model implementation which included both of these effects. Performance comparison of two codes on such IEEE CMs are set forth in the Second Parent Provisional.

In summary, our simulation studies suggested that implementing our 27 Mbps CMS results in a relatively small performance loss with respect to the standard 6.8 Mbps scheme. Further, sensitivity loss was observed to be due mostly to the 27 Mbps PHR reception error. This may be at least partly alleviated by using a stronger block code for the PHR error correction—at this point we recommend considering the BCH(15,7) code. However, we expect the improvement to be relatively insignificant.

However, when we consider the simulation studies as a whole, we must conclude from the relative performance of two possible codes-"Orthogonal code" and "Proakis code"—that there is no clear winner. On one hand, the "Proakis code" does increased sensitivity on AWGN, as predicted by the theory. On the other hand, the "Orthogonal code" appears to us to work better on all of the IEEE multipath channel models we considered. Hence, we conclude that implementation complexity should be the decisive factor when choosing between these two codes.

Since we completed our simulation studies, we have concluded that the Orthogonal code has additional advantages over the Proakis code that can be exploited in many embodiments. By way of example, in Slides 16 and 17 of our Third Parent Provisional, we note that, using the Orthogonal code, the mean PRF can be varied so as to optimize relative parameters of different parts of the packet. In the Standards, mean PRF was allowed to vary, but only slightly, e.g., within a few percent. This flexibility made it easier to design, for example, automatic gain control ("AGC") algorithms. With similar PRF across the whole frame, gain parameters would not change significantly because the same energy level reaches the receiver per unit of time. One consequence of introducing variable PRF is that the AGC receiver gain algorithms must be designed to accommodate sudden changes of received power, without distorting the received pulses. When the change in PRF happens, even if the transmitted pulse amplitudes do not change, the average receive power will change, but the receiver should keep the gains the same to maintain the pulse amplitude. If the receiver knows when the change in PRF will happen, it can indicate to the AGC algorithm that at a certain point in receiving the signal it should not change the gains significantly. In some embodiments, there are multiple gain stages in the receiver strip. In such embodiments, the equivalent of not changing the gains significantly is to adjust one of the strip gains in the opposite direction to another strip gain.

In some embodiments, it is advantageous for the transmitter to change the pulse amplitude for different sections of the packet. This may be associated with a PRF change, but another reason to do it is to make different sections more, or less, robust. In such a case, the receiver often knows the difference in amplitude between the pulses in each portion of the signal, and it can change the gain by an amount that keeps the amplitude constant in the receiver.

To put it another way: if we know when the PRF is going to change, we can, before that happens, freeze the gain (or the overall strip gain). Or, if we know that the pulse amplitude is going to change, rather than let the AGC do it automatically, we can expressly change the gain by the known amount.

Let us consider just these examples:

1. The frame typically consists of synchronization preamble, SFD, (optional) cipher sequence, and (optional) data payload. In one embodiment, each of these parts may be transmitted using a substantially different PRF. For example, the synchronization preamble may consist of length-127 "4a" standard Ipatov codes ("PRF64") or length-31 Ipatov ternary codes (see our Second Parent Provisional, Table 2 on page 6 and Table 3 on page 7) with mean PRF of 100 MHz; or some other synchronization sequence, having different mean PRF.
2. The cipher sequence, if present, may also have variable mean PRF as described in Sec. 16.2.8.3 of our Second Parent Provisional, where two variants are considered, using mean PRF of either 62.4 or 121 MHz.
3. The data payload may also have variable mean PRF. In accordance with the Standards, the regular "4a" data modulation mode uses mean PRF64. However, we note that it is possible to enhance data payload performance by increasing mean payload PRF to PRF256 (see, Sec. 16.3.4 in our Second Parent Provisional), or by using other possible variants having PRF100, 167 or 125 (see, Slide 11 in our Third Parent Provisional).

Apart from having PRF which differs between parts of the frame, it is also beneficial to have different symbol lengths in different parts of the frame. For example here, the Ipatov-31 preamble consists of shorter 248 ns symbols. In the case of compressed cipher symbols (having mean PRF121) which are transmitted continuously without any gaps there between, it is possible to treat and process this cipher sequence as consisting of symbols which can have any length. For example, a cipher consisting of 64 1024 ns symbols may be treated as 128 512 ns symbols as or 256 256 ns symbols. Similarly, data payload, which is transmitted continuously, may be processed as consisting of symbols having many possible lengths. In general, the benefits of using different symbol lengths may include, for example, carrier recovery and timing tracking, where generally shorter symbols may make it easier to acquire and track synchronization, especially with high carrier frequency offsets.

Shorter length of symbols may be beneficial in some processing algorithms. For example, with longer symbols, at high CFO, there is a very significant phase rotation occurring between symbols. As a consequence, typical carrier recovery algorithm could fail to synchronize. It can be demonstrated that introducing shorter symbols, thereby reducing phase rotation per symbol, reduces this problem. Shorter symbols could also result in faster performance of other algorithms, which typically work on a per-symbol basis. For example, instead of 32*1016 ns, they could finish the processing in 32*248 ns with the shorter Ipatov-31. This would result in shorter frames, and savings of both transmitted energy and of the energy used for receiver processing.

However, we submit that using higher PRF across the whole frame would be sub-optimal. For example, during transmission of the initial synchronization preamble, there is no need to significantly increase energy density (related to higher PRF), because normal system sensitivity during preamble detection and synchronization is sufficient, and generally higher than that of data payload demodulation. In other words, it makes more sense to us to increase PRF during the packet "bottlenecks". For example, one such "bottleneck" is data demodulation. Therefore, using higher PRF during data transmission allows for equalizing performance of all parts of the packet by increasing the range at which the data can be successfully demodulated.

We further submit that using higher PRFs is particularly useful during highest bit-rate modes, where, generally, transmission of each bit takes less time. For example, our 27 Mbit/s scheme transmits each bit in 4× shorter time than the 6.8 Mbit/s scheme. If constant PRF was used, our 27 Mbit/s scheme would be able to transmit 4× less energy per bit than 6.8 Mbit/s scheme, which would lead to significant range reduction. Increasing PRF in this case helps recover the lost performance.

As noted above, there are significant benefits of using higher PRF in the data payload portion of the packet. One of them in transmitter/receiver battery saving due to shorter airtime. However, in some applications, such as file transfer or video-streaming, higher bit-rates and much larger data payloads are required. In such applications, frames would again become very long, and, especially with increased PRF, the Tx would be required to reduce power-per-pulse-per-1 ms as per regulatory limitations. As a consequence, very long data frames (or long ciphers) would have much shorter range.

In order to keep packets shorter (for battery saving) and still have satisfactory range, we propose to transmit packets dis-continuously. We submit that transmitting packets dis-continuously is of significant benefit because:
1. It will help avoid the transmit power limit which is set forth in the Standards to a fixed Tx power maximum per 1 ms of transmission time. However, if a packet could be split into parts and transmitted over several milliseconds, we could use multiple Tx power limits.
2. Dis-continuous or bursty transmission allows for shutting down the receiver to save power between successive transmission bursts. To us, it makes more sense to send the packet components using short bursts separated by silence gaps, rather than to stretch, i.e., slow down or spread by using lower PRF, transmission of the packet over time. The reason is that the receiver can be shut down during the gaps, thus saving power, which is especially important in battery-powered receivers. So, in the example illustrated in FIG. 3, the transmitter can operate continuously for, say, 100 μs, then remain silent for 900 μs, then resume continuous operation for 100 μs, then return to silence for 900 μs, etc. In some embodiments, the bursts can be concentrated, as shown in FIG. 4.
3. Even in cases where maximum Tx power is not an issue, dis-continuous packets can still be very useful, for example, in products powered by a small battery supported by a capacitor (the capacitor is often needed because the small battery itself cannot supply sufficiently high peak current for the UWB circuits). Such applications include, for example, small car key fobs or other small wearable items. In such embodiments, due to space limitations, the size of the capacitor itself is limited. Since the combination of small battery and small capacitor can only supply high current for a very limited amount of time (to power the UWB circuits), our bursty packet structures will allow some time to recharge the capacitor before the next burst.

Figure 3:
FIG. 3 illustrates, in linear time form, a continuous packet transmission sequence having a bursty preamble.
Figure 4:
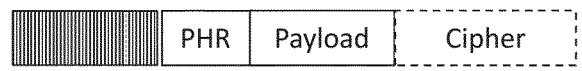
FIG. 4 illustrates, in linear time form, a continuous packet transmission sequence having a concentrated preamble.

Both of the packet structures depicted in FIG. 3 and FIG. 4 use short Ipatov preamble symbols in order to facilitate coherent preamble detection on the expense of wrap-around of the longer channels' impulse responses. A second common characteristic is that the energy of the packet is concentrated in "active" periods with high-energy pulses, whereas "silent" periods are intended for the Tx and Rx to turn off as many blocks as possible, especially analog ones, and thus save power. Thus, while the packet structure depicted in FIG. 3 allows for packets of arbitrary lengths, the packet structure depicted in FIG. 4 is intended only for short packets, since increasing the packet length above the prescribed maximum would produce mean power spectra with levels above the −41.3 dBm/MHz limit set in the Standards. On the other hand, synchronization in FIG. 3 is considerably more complex, since it consists not only of a simple decision if the preamble is present or not, but also finding a possible burst position and thus require longer preamble detection times. Furthermore, Tx and especially Rx duty-cycling in FIG. 3 is considerably less efficient, since parts of Tx and Rx need to turn on and off considerably more frequently than in FIG. 4. Also, in FIG. 3 more "on" time is required before and after every preamble burst. Considering all of the above advantages of FIG. 4 in comparison with FIG. 3, it appears to us to be rather beneficial to alleviate its one shortcoming, i.e., packet size limitation. Let us now consider possible approaches to do this.

The main idea is that the concentrated packet is divided up into chunks that are of a length that is less or equal to the maximum length of the usual concentrated packet. This maximum length produces the mean power spectral level that meets the 41.3 dBm/MHz limit within 1 ms. The distance between starts of the chunks should be slightly above 1 ms. In this way, the 1 ms window for the power spectra density ("PSD") would never exceed above the prescribed limit.

Figure 5:
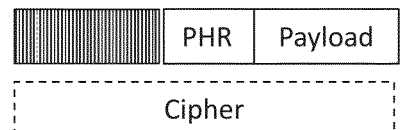
FIG. 5 illustrates, in linear time form, a first possible dis-continuous packet transmission sequence.

Let us now consider possible structures of the packet, i.e., how to divide-up the packet into chunks that can be transmitted at variable PRF. It is obvious that the Ipatov preamble, start of frame delimiter ("SFD") and physical header ("PHR") should be transmitted together in the same chunk. The PHR should contain a field defining the structure of the packet, i.e., its break-up into different chunks, which will be dependent on the needed length of different fields. Depending on the payload length, it could also be in the same chunk with the Ipatov preamble, SFD and PHR. The only part different from the usual concentrated packet would be the cipher, which would now be in a separate chunk as illustrated in FIG. 5. The beginnings of two chunks are slightly more than 1 ms apart. This structure, however, does limit the length of the cipher to one chunk.

Figure 6:
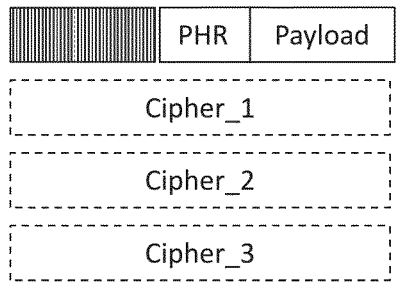
FIG. 6 illustrates, in linear time form, a second possible dis-continuous packet transmission sequence.

If longer cyphers are needed, one possible approach would be to have multiple cipher fields. Then, as illustrated in FIG. 6, each cipher field would be separately accumulated and processed. Note that only the existing accumulators would be required, since the receiver facility 14 would have enough time to finish before the start of the next cipher.

Figure 7:
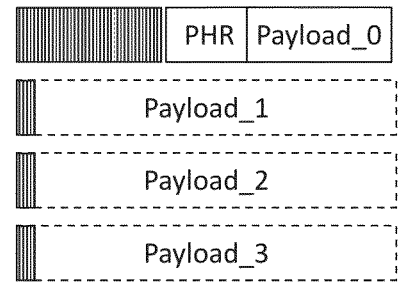
FIG. 7 illustrates, in linear time form, a third possible dis-continuous packet transmission sequence.

Packets with long payloads, e.g., for streaming applications, would have payloads divided into chunks, as illustrated in FIG. 7. In one embodiment, preceding each chunk a synchronization pilot could be added for timing and phase recovery.

Figure 8:
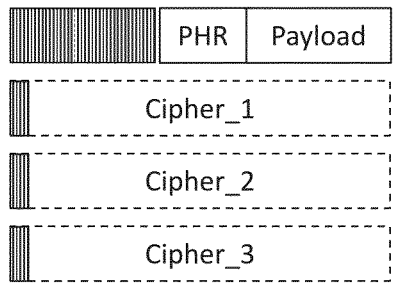
FIG. 8 illustrates, in linear time form, a fourth possible dis-continuous packet transmission sequence.

Running channel impulse response analysis on different accumulators, each containing only a fraction of the total received cipher energy, is expected to cause a degradation in performance in comparison with the case when the whole cipher is accumulated in a single accumulator. For this reason, using the optional synchronization pilot in front of each cipher, as illustrated in FIG. 8, should be considered. Then, such cipher fields could be accumulated together in a single accumulator.

Figure 9:
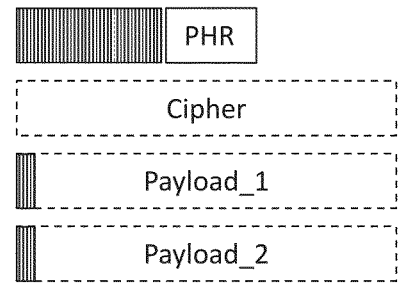
FIG. 9 illustrates, in linear time form, a fifth possible dis-continuous packet transmission sequence.

In some embodiments, mixing of the above concepts in a packet is possible. For example, the payload may be located after the cipher, as illustrated in FIG. 9.

Applying these principles of our invention allows for efficient receiver duty cycling without reducing average transmitted power. The main open issues are the length and the structure of the pilot field. Also, related, how to do pilot timing and phase synchronization. In general, the receiver 14 should be able to estimate correct timing from the carrier frequency offset ("CFO") estimate within a few ns, before receiving the pilot field. One approach to achieving synchronization is to correlate the output of the channel match filter ("CMF") with the pilot sequence and then periodically updating the correlation using the carrier/timing loop.

Although we have determined that various burst patterns are possible, each has it's unique advantages and disadvantages. First, we note that the Tx bursts do not need to have exactly the same length or contents. For example, in FIG. 3 and FIG. 4, the 1st burst can include synchronization preamble and data payload, and subsequent bursts can contain parts of the cipher sequence. Or, as in FIG. 5, they can contain parts of longer data payload.

The timing pattern can also be flexible. For example, slow switching could be implemented with each Tx burst lasting 100 μs followed by 900 μs of silence, OR there could be shorter gaps, for example 50 us Tx/450 μs gaps. FIG. 4 illustrates a particularly "dense" ON/OFF scheme, where Tx is ON for 1 μs followed by 7 μs silence. Preferably, the Tx pattern should be very flexible (any Tx time/any silence gap) and the duty cycle should also be variable. In general, longer gaps make switching easier and allow for more time to recharge, for example, capacitors supporting a small battery. However, longer gaps may cause some re-synchronization problems, and may require additional short pilots before each burst (as shown in FIG. 7, FIG. 8, and FIG. 9). Shown in FIG. 10 is an example transmission of multiple data payloads but without extra SYNCs; whereas, in the example shown in FIG. 11, each chunk of the data payload is preceded by a respective SYNC. In the example shown in FIG. 12, a transmission of a first chunk of the data payload is followed by an ACK return message, and then proceeds to the next chunk of the data payload; whereas, in the example shown in FIG. 13, the ACK follows transmission of multiple chunks of the data payload. Of course, other packet structures may be constructed, all made possible by our invention.

Although we have described our invention in the context of particular embodiments, one of ordinary skill in this art will readily realize that many modifications may be made in such embodiments to adapt either to specific implementations. By way of example, it will take but little effort to adapt our invention for use with different communication schemes. Further, the several elements described above may be implemented using any of the various known semiconductor manufacturing methodologies, and, in general, be adapted so as to be operable under either hardware or software control or some combination thereof as is known in this art. Alternatively, the several methods of our invention as disclosed herein in the context of special purpose receiver apparatus may be embodied in computer readable code on a suitable non-transitory computer readable medium such that when a general or special purpose computer processor executes the computer readable code, the processor executes the respective method.

Thus it is apparent that we have provided several improved methods and apparatus for use in the transceiver of a wireless communication system to transmit packets at variable PRF. We have further provided improved methods and apparatus to transmit packets dis-continuously. Although we have so far disclosed our invention only in the context of a packet-based UWB communication system, we appreciate that our invention is broadly applicable to other types of wireless communication systems, whether packed-based or otherwise, that perform channel sounding. Further, we submit that our invention provides performance generally comparable to the best prior art techniques but more efficiently than known implementations of such prior art techniques.

The invention claimed is:

1. A method for use in an ultra-wideband communication system for transmitting a packet comprising first and second portions, the method comprising configuring a transmitter facility of the system to perform the steps of:
    transmitting the first portion of the packet at a selected first pulse repetition frequency ("PRF"); and
    transmitting the second portion of the packet at a selected second PRF different from the first PRF, wherein:
        the second portion of the packet is further characterized as comprising a data payload; and
        the second PRF is selected to reduce a transmission duration of the data payload.

2. The method of claim 1, wherein the first portion of the packet comprises at least one of:
    a preamble;
    a physical header; or
    a cipher.

3. The method of claim 1, wherein the composition of at least the first portion of the packet is pre-defined.

4. The method of claim 3, wherein:
    the first portion of the packet is further characterized as comprising a synchronization sequence of a selected one of a plurality of preamble symbols; and
    the first PRF is selected as a function of the selected one of the plurality of preamble symbols.

5. The method of claim 3, wherein:
    the first portion of the packet is further characterized as comprising a synchronization sequence of a selected one of a plurality of preamble symbols; and
    a length of the selected one of the plurality of preamble symbols is selected to increase a carrier recovery update rate.

6. The method of claim 1, wherein:
    the second PRF is further selected to increase an energy per bit of the data payload.

7. The method of claim 1, wherein the second portion of the packet is further characterized as comprising a selected one of a plurality of ciphers.

8. The method of claim 1, wherein the second portion of the packet further comprises at least one of:
    a physical header; or
    a cipher.

9. A wireless communication system, comprising:
    a transmitter, the transmitter operable to transmit a packet comprising a first portion and a second portion, wherein:
        the first portion of the packet is transmitted at a first pulse repetition frequency ("PRF"); and
        the second portion of the packet is transmitted at a second PRF that is different from the first PRF, wherein:
            the second portion of the packet is further characterized as comprising a data payload; and
            the second PRF is selected to reduce a transmission duration of the data payload.

10. A non-transitory computer readable medium including executable instructions which, when executed in a processing system, cause operations to be performed, the operations comprising:
    transmitting a first portion of a packet at a first pulse repetition frequency ("PRF"); and
    transmitting a second portion of the packet at a second PRF that is different from the first PRF, wherein:
        the second portion of the packet is further characterized as comprising a data payload; and
        the second PRF is selected to reduce a transmission duration of the data payload.

* * * * *